W. E. SCHEIBNER.
VARIABLE SPEED TRANSMISSION DEVICE.
APPLICATION FILED DEC. 9, 1913.

1,153,261.

Patented Sept. 14, 1915.
2 SHEETS—SHEET 2.

Witnesses
Harold Scantlebury
Edna Broyles

Inventor
Walter E. Scheibner

By Herbert E. Smith
Attorney

UNITED STATES PATENT OFFICE.

WALTER E. SCHEIBNER, OF WILBUR, WASHINGTON.

VARIABLE-SPEED-TRANSMISSION DEVICE.

1,153,261.   Specification of Letters Patent.   Patented Sept. 14, 1915.

Application filed December 9, 1913. Serial No. 805,554.

*To all whom it may concern:*

Be it known that I, WALTER E. SCHEIBNER, a citizen of the United States, residing at Wilbur, in the county of Lincoln and State of Washington, have invented new and useful Improvements in Variable-Speed-Transmission Devices, of which the following is a specification.

My invention relates to variable speed gearing of what is commonly known as the planetary type. It provides a simple power transmission device which has an extremely flexible range of control, is practically noiseless in operation, and comprises a minimum number of parts. Furthermore it provides a transmission means particularly adapted to be used in automobile construction because of its efficient and durable operation, flexibility and simplicity of control.

Figure 1:
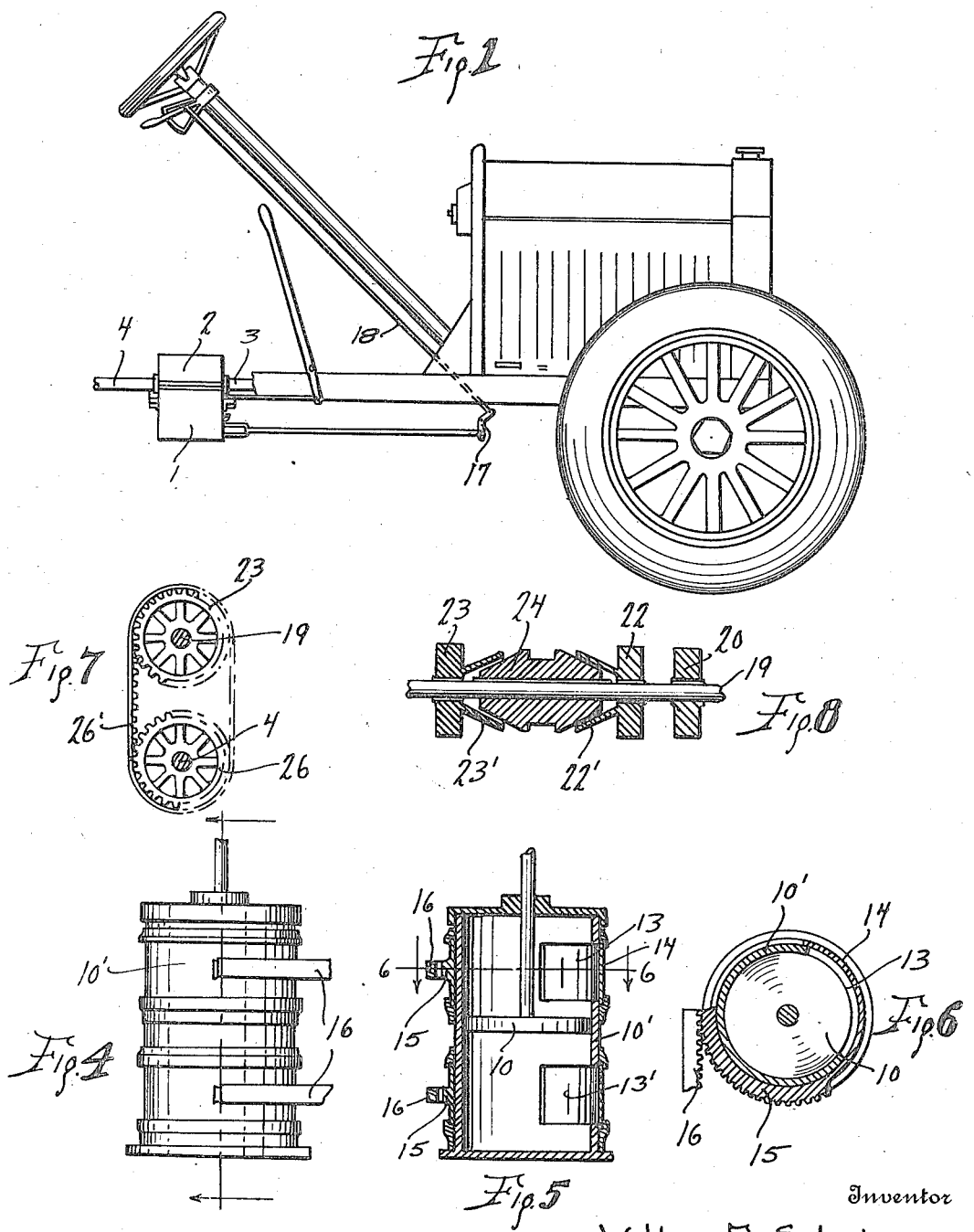
Figure 2:
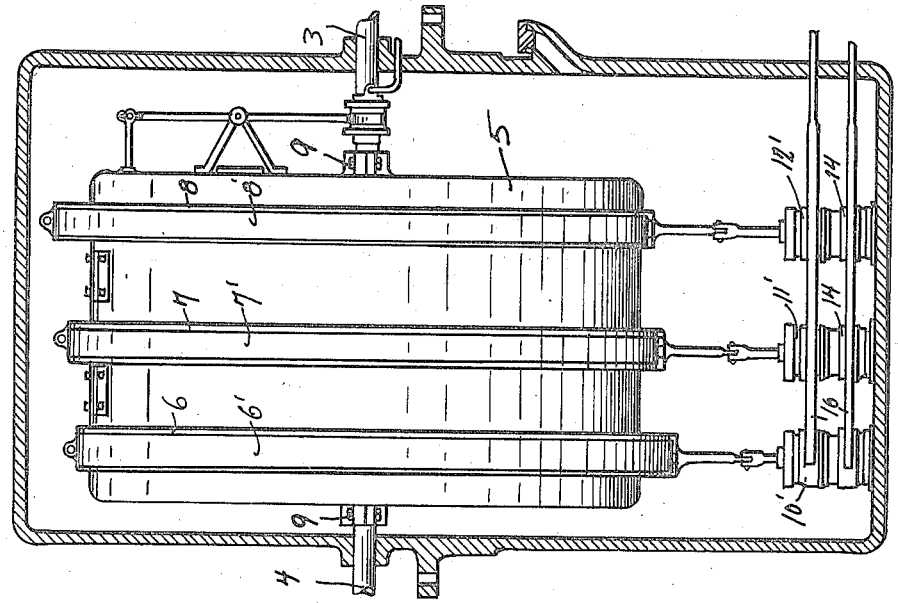
Figure 3:
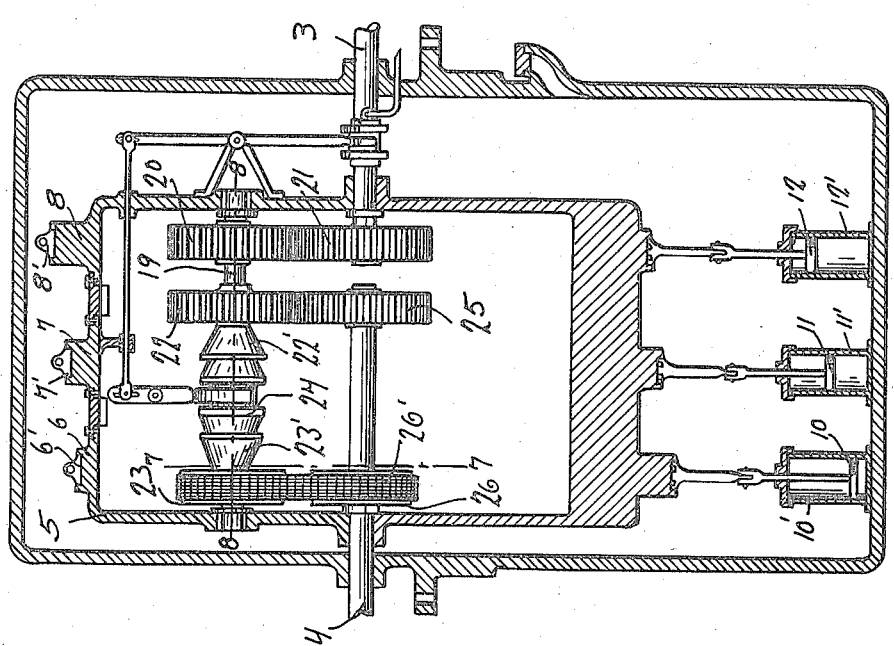

In the drawings annexed hereto and forming a part of this specification:—Figure 1 illustrates a partial side elevation of an automobile embodying my invention. Fig. 2 is a side elevational view of my transmission showing the outer casing in section on a vertical plane, so as to show the arrangement of parts therein. Fig. 3 is a sectional view on a vertical plane, through both the outer and inner casings and showing the details embodied therein. Fig. 4 is a side elevational view of one of the fluid control cylinders. Fig. 5 is a vertical sectional view through one of the fluid control cylinders showing the piston and ports. Fig. 6 is a transverse section through the cylinder shown in Fig. 5, taken on the line 6—6 of Fig. 5. Fig. 7 is a section on the line 7—7 of Fig. 3, illustrating the silent chain drive for the reverse gear. Fig. 8 is a section on the line 8—8 of Fig. 3 showing the details of the clutch mechanism.

Throughout the separate views the same part is designated by the same reference character.

Referring to the drawings, my invention as illustrated herein comprises an exterior casing consisting of a lower and upper half 1 and 2 respectively, suitably mounted upon the framework of an automobile and having the driving shaft 3 and the driven shaft 4 suitably journaled therein, the object being to provide an intermediate gearing between the shafts 3 and 4, whereby the speed of the driven shaft 4 may be varied at will regardless of the speed of the driving shaft 3. Journaled on the shafts 3 and 4 within the said exterior casing is mounted the hollow eccentric drum 5 having integral with the periphery thereof the three eccentrics 6, 7 and 8, the said eccentric drum being formed in two parts and bolted together at 9. Mounted on the eccentric surfaces of the drum are the three eccentric straps 6', 7' and 8', respectively, said straps being connected to and adapted to reciprocate the pistons 10, 11 and 12 in the cylinders 10', 11' and 12', respectively, said cylinders being mounted in the lower half of the exterior casing and submerged in oil or other liquid. Each of said cylinders contains an upper and lower port 13 and 13', respectively. The openings of these ports are controlled by the revoluble sleeve 14 mounted on said cylinders and having openings therein adapted to register with said port openings of the cylinders. Each of the sleeves carries a toothed segment 15 engaging a rack bar 16, connected by means of a bell crank and rod 17 to an operating lever 18 whereby the movement of the sleeve 14 may be controlled, thereby controlling the amount of liquid entering the cylinder through the port openings 13 and 13'.

Within the eccentric drum 5 and eccentric with respect to the shafts 3 and 4, is journaled a shaft 19 carrying a gear 20, keyed or otherwise secured thereto, and meshing with a gear 21 keyed to the driving shaft 3. Journaled on the shaft 19 are the gears 22 and 23 carrying the cone clutch members 22' and 23', respectively, having their large ends adjacent each other and adapted to be engaged by the double cone member 24 slidably mounted on the shaft 19 but non-rotatable with respect thereto.

The driven shaft 4 carries a gear 25 meshing with the gear 22, and also a gear 26 connected to the gear 23 by means of the silent chain drive 26'. The double cone member 24 may be brought into engagement with either of the cone members 22 or 23 by moving the same longitudinally of the shaft 19, suitable means being provided for this purpose as shown in the drawings.

The operation of the transmission is as follows:—When the shaft 3 is at rest and it is not desired to drive the vehicle the various parts of the mechanism are brought into the position shown in the drawing. Moreover, if it is desired to drive the shaft 4 the shaft 3 is forced to revolve by the engine and the rack bar 16 moved into such a position that the sleeves 14 close entirely, or partially close, according to the speed desired, the portions 13 and 13' of the cylinder. The shaft 3 revolves the eccentric drum 5 thereby causing the pistons 10, 11 and 12 to reciprocate in their respective cylinders. It will be seen that the oil thus trapped in the cylinders offers resistance to the reciprocation of this piston and retards the rotative movement of the eccentric drum. As the rotative movement of the eccentric drum is retarded the shaft 19 tends to rotate faster while its planetary movement about the shafts 3 and 4 is retarded, therefore the shaft 19 is driven more positively as the casing speed is retarded. If the double cone member 24 be moved so as to engage the female cone member 22' carried by the gear 22, the shaft 4 will be caused to rotate and drive the vehicle in a forward direction. If it is desired, however, to drive the shaft 4 in a reverse direction, the double cone member may be thrown into engagement with the female cone member 23' carried by the chain drive gear 23, when the latter will drive the shaft 4 through the medium of the silent chain drive.

It is understood that modifications may be made in my invention without departing from the spirit and scope of the same.

Having thus described my invention, what I claim is:—

1. A variable speed reversible gear transmission mechanism comprising in combination a driving shaft, a driven shaft coaxial with said driving shaft, gears fixed to said driving and driven shafts, a drum rotatably mounted on said shafts, a planetary shaft rotatably mounted in said drum, a gear fixed on said planetary shaft and meshing with said driving gear, a gear loose on said planetary shaft and meshing with said driven gear, a sprocket fixed on said driven shaft, a sprocket loose on said planetary shaft, a drive chain between said sprockets, clutch members fixed to said loose sprocket and said loose gear, a clutch member on said planetary shaft and adapted to engage either of said first mentioned clutch members in order to lock the loose sprocket or the loose gear to the planetary shaft, a lever fixed to said drum for moving said last mentioned clutch member, a link connected to said lever, a lever connected to the outer end of said link and pivoted on the outside of the drum, a collar slidably mounted on one of the coaxial shafts, means whereby said collar may be shifted to give either a forward or reverse drive, and means for braking said drum when desired.

2. A variable speed reversible gear transmission mechanism comprising in combination a driving shaft, a driven shaft coaxial with said driving shaft, gears fixed to said driving and driven shafts, a drum rotatably mounted on said shafts, a planetary shaft rotatably mounted in said drum, a gear fixed on said planetary shaft and meshing with said driving gear, a gear loose on said planetary shaft and meshing with said driven gear, a sprocket fixed on said driven shaft, a sprocket loose on said planetary shaft, a drive chain between said sprockets, clutch members fixed to said loose sprocket and loose gear, a clutch member mounted on said planetary shaft and adapted to engage either of said first mentioned clutch members in order to lock the loose sprocket or the loose gear to the planetary shaft, a lever fixed to said drum for moving said last mentioned clutch member, a link connected to said lever, a lever connected to the outer end of said link and pivoted on the outside of the drum, a collar slidably mounted on one of the coaxial shafts, means whereby said collar may be shifted to give either a forward or reverse drive, and means for braking said drum when desired, said means comprising a plurality of eccentrics on the outer face of the drum, a plurality of cylinders having pistons therein, connections between said pistons and said eccentrics, a casing inclosing said drum and said cylinders, said cylinders having ports connecting the interior of the casings with the interior of the cylinders, and means for controlling said ports.

3. A variable speed reversible gear transmission mechanism comprising in combination a driving shaft, a driven shaft coaxial with said driving shaft, gears fixed to said driving and driven shafts, a drum rotatably mounted on said shafts, a planetary shaft rotatably mounted in said drum, a gear fixed on said planetary shaft and meshing with said driving gear, a gear loose on said planetary shaft and meshing with said driven gear, a sprocket fixed on said driven shaft, a sprocket loose on said planetary shaft, a drive chain between said sprockets, clutch members fixed to said loose sprocket and said loose gear, a clutch member on said planetary shaft and adapted to engage either of said first mentioned clutch members in order to lock the loose sprocket or the loose gear to the planetary shaft, a lever fixed to said drum for moving said last mentioned clutch member, a link connected to said lever, a lever connected to the outer end of said link and pivoted on the outside of the drum, a collar slidably mounted on one of the coaxial shafts, means whereby said collar may be shifted to give either a forward or reverse drive, and means for braking said drum when desired, said means including a plurality of eccentrics on the exterior of said drum, a plurality of cylinders having pistons therein, connections between said pistons and said eccentrics, said cylinders having ports therein and means for controlling said ports including sleeves arranged to rotate on said cylinders and having ports therein, and racks for operating said sleeves, each rack being arranged to operate a plurality of sleeves in unison.

In testimony whereof I affix my signature in the presence of two witnesses.

WALTER E. SCHEIBNER.

Witnesses:
G. THOMPSON,
E. H. ASWALT.